United States Patent [19]
Watson

[11] 3,881,282
[45] May 6, 1975

[54] ABRASIVE GRAIN OF FUSED ALUMINA-ZIRCONIA-CERIA ALLOY

[75] Inventor: George R. Watson, Niagara Falls, Ontario, Canada

[73] Assignee: Norton Company, Worcester, Mass.

[22] Filed: Oct. 24, 1973

[21] Appl. No.: 409,323

[52] U.S. Cl. .................... 51/309; 51/298; 106/57; 106/65
[51] Int. Cl. .................... C04c 1/68; C04b 31/16
[58] Field of Search .................... 51/309; 106/65, 57

[56] References Cited
UNITED STATES PATENTS

| | | | |
|---|---|---|---|
| 2,915,407 | 12/1959 | Gulton | 106/57 |
| 2,924,533 | 2/1960 | McMullen | 106/65 |
| 3,110,102 | 11/1963 | Pfefferkorn | 106/65 |
| 3,181,939 | 5/1965 | Marshall | 51/309 |
| 3,317,293 | 5/1967 | Reuter et al. | 51/309 |

FOREIGN PATENTS OR APPLICATIONS

| | | | |
|---|---|---|---|
| 924,966 | 5/1963 | United Kingdom | 106/57 |
| 158,576 | 10/1971 | Hungary | 106/57 |

*Primary Examiner*—Donald J. Arnold
*Attorney, Agent, or Firm*—Oliver W. Hayes

[57] ABSTRACT

Improved fused zirconia alumina is decribed. The abrasive is superior to normal alumina-zirconia abrasive in two ways.

1. Where processed into grain, the grain yield is much higher, which gives a lower comminution cost per pound of useable grain.

2. The grain durability is much higher, while maintaining or improving the rate of metal removal, in snagging tests.

These improvements are realized by making an addition of from 1 to 7% of ceria to an alumina-zirconium fusion.

4 Claims, No Drawings

ABRASIVE GRAIN OF FUSED ALUMINA-ZIRCONIA-CERIA ALLOY

BACKGROUND OF THE INVENTION AND PRIOR ART

Fused alumina-zirconia alloy abrasives have demonstrated their superiority in the early 1960's as exemplified in the U.S. Pat. No. 3,181,939. Recent work by R. E. Barks (as described in the co-pending application filed concurrently herewith,) has shown the improved results obtained on the addition of ceria to an alumina and zirconia mixture which is sintered to form an abrasive grain. German Pat. application No. 2212311 published Oct. 26, 1972 contains one example of an alumina-zirconia spinel abrasive containing less than 1% ceria which is apparently added to stabilize the zirconia grain.

Referring to the textbook "Abrasives" by L. Coes, Jr. Springer-Verbag N.Y. 1971, page 124, concerned with the Theory of Grinding, is the equation $$M = \frac{KPVW}{a+W} \quad (1)$$

where:
M = metal removal rate in pounds per hour
P = force in pounds between grinding wheel and workpiece
V = peripheral speed in feet/minute
K = abradability constant of the metal
W = volume rate of disintegration of the wheel structure in cubic inches per hour
a = destructibility factor of the abrasive on page 127 the grinding cost is $$C = \frac{AW+L}{M} \quad (2)$$

where:
c = cost in cents per pound of metal removed
A = abrasive cost in cents per cubic inch
L = Labor plus overhead in cents per hour Substituting in equation (2) the value of M from equation (1) gives $$C = \frac{(AW+L)(a+W)}{KPVW} \quad (3)$$

The minimum value of grinding cost is $$C_{min} = (aA + L + \frac{2\sqrt{aLA}}{KPV}$$

which occurs when $W = \frac{\sqrt{aL}}{A}$

From the above it can be seen that the lower the $a$ of an abrasive the lower is the grinding cost that can be achieved. That is lower wheel wear rate will lower grinding costs if the wheel still removes metal at a reasonable rate.

SUMMARY OF THE INVENTION

In the present invention a substantial amount of ceria (between 1 and 7% is included in the fused mixture of alumina and zirconia and the product is then chill-cast to obtain very fine crystal size. In the preferred embodiment of the invention the grain is strengthened by heating to 800°–1250°C for 2 hours.

DETAILED DESCRIPTION OF THE INVENTION

Alumina-zirconia alloy abrasives have been fused and cast in the past, as generally described in U.S. Ser. No. 212,614 (South African Patent Application No. 8975/72 published Sept. 26, 1973).

In following this casting procedure in the practice of my invention, a small arc furnace of the casting type was employed. The starting mixture was as shown in the following example.

EXAMPLE I

| | |
|---|---|
| Calcined Bayer alumina | 69 lbs. 3 oz. (A10) |
| Baddeleyite $ZrO_2$ | 23 lbs. 3 oz. |
| Ceria | 7 lbs. 3 oz. |

Analysis of the A10 and $ZrO_2$ are cited below.

Table I

| Impurity | A10 | Baddeleyite |
|---|---|---|
| $SiO_2$ | 0.08 | 0.80 |
| $FeO_3$ | 0.04 | 0.22 |
| $Na_2O$ | 0.10 | 0.43 |
| CaO | — | 0.23 |
| MgO | — | 0.22 |

The furnace is normally operated at 85 volts 185 Kw when fusing alumina zirconia. With ceria in the furnace feed it was necessary to operate at 100 volts 185 Kw to minimize the tendency of ceria to be reduced to a lower oxide state. Six taps were made producing 480 pounds of product with a light greenish tinge. The resulting fused cast product had the following analysis.

| | |
|---|---|
| $SiO_2$ | 0.15% |
| $Fe_2O_3$ | 0.23 |
| $TiO_2$ | 0.56 |
| $Na_2O$ | 0.03 |
| $ZrO_2$ | 22.51 |
| $CeO_2$ | 6.14 |

The material was then impact crushed and shaped under controlled comminution conditions. A sample of the crude product is accumulated during a conventional jaw crushing operation by taking a portion of each shovelful of —one-half inch crushed product. This sample of crude product is further reduced in size by standard sample-room practice (jaw + rolls crushing) to yield a 14 grit Tyler screen sample and, after further pulverization a portion of this sample that is 140 mesh and finer is collected, both of these 2-oz. size samples are analyzed, the former by microscopic examination, the latter by chemical analysis. The remainder of the crude sample of the abrasive product that is about minus one-half inch in size is first weighed then passed through an impact crusher like that shown in U.S. Pat. No. 2,644,644 that can be fed by means of a Syntron Vibrating Feeder at the rate of forty pounds per minute. The paddle speed of the crusher is set at 1500 r.p.m. with a paddle radius of about 22 inches so the tip of the impeller is running at about 8600 ft./min. After each pass through the impact crusher, the product is passed over a 2 × 6 inch Rotex screen fitted with 6 mesh and 24 mesh Tyler screens. This yields three products, namely, +6 (−6+24) and (−24). The +6 product is recycled through the impact crusher. After each pass through the crusher the product is rescreened and the +6 size recycled again. This process is continued until 95% of the initial feed has been crushed to −6 mesh. The remaining +6 material is rolls crushed to −6 mesh and added to the −6 mesh products.

The (−6+24) product developed as above, is passed through the crusher three times in succession at (1500 r.p.m.). A representative sample is taken and the impact strength measured by the $k$ value method described below. If the 8/9 and 12/14 fractions have $k$ values that meet a specified value no further shaping is done. If the $k$ values are still too high, the material is given one or more additional shapes until $k$ value measurements are acceptable.

The final crushed and impact shaped product is again sampled and a screen analysis made to determine what grit sizes have been produced and the yield of these sizes.

The (−6 +24) crushed and impact shaped product is then placed in the three-foot pan mill (60–70 lbs. per batch) and dry-panned for from 1 to 2 hours, or until the grain has been rounded sufficiently so a desired weight per cubic foot specification is met. The WPCF specification is adjusted for density differences, of course. The panned product is then screened into desired grit sizes. Normally 10, 12, 14 and 16 grits are shipped for grinding tests. WPCF measurements and the real density of the product are also made.

At the same time a representative lot of fused alumina zirconia of the same zirconia content but containing no ceria, was processed under identical conditions. The yield of grain from both these products is compared in the following table.

Table 3

| Grit Size | Yield of grit sizes as % of Cast Material | |
|---|---|---|
| | Ceria Containing Product | Standard Product |
| 10 | 9.0 | 3.5 |
| 12 | 9.0 | 8.9 |
| 14 | 14.0 | 16.1 |
| 16 | 8.0 | 6.6 |

Grain from the ceria-containing product was formed into laminar grinding wheels, and at the same time grain from a standard lot of alumina-zirconia abrasive was made into similarly constructed grinding wheels. In our laboratory comparative tests for new snagging abrasives, such wheels were made with the new abrasive and with a standard abrasive for comparison. In the case of this invention 16 inch wheels were made with snagging abrasive grains, with Norton's ZS a cofused alumina-zirconia grain with about 25% zirconia present, and others with the grain to be tested, the wheels being made with a standard resin bond in the form of laminar wheels. The center sections of these wheels were 1 inch thick with two side faces seventeen thirty-seconds of an inch thick. A typical center section for each wheel included grits of ZS alumina-zirconia or the grain to be tested, in the 10 to 12 grit range for example with the side faces having 16 grit fused crushed alumina grits in the same bond.

In running the test these laminar wheels are compared in a grinder having a hydraulic pressure means to maintain the wheel being tested under a pressure of about 400 pounds against the billet. The wheels are run under simulated snagging grinding conditions at 9500 s.f.p.m. for an initial break-in period of 20 minutes and then under the same pressure and s.f.p.m. the same wheel is run for its test in three consecutive 20 minute runs. After each 20 minute period the billet is removed from under the wheel and weighed while another billet of the identical composition is put under the wheel for each of the succeeding runs. Each of the three billets is weighed in turn and the cumulative weight of metal removed is determined. The wheel is weighed once at the end of the three runs to determine the amount of wheel wear. During the running of the test, the side faces of the laminar wheels, being made of a finer alumina abrasive, act as soft side faces and erode away so that the essential grinding action against the billet is performed by the center section of the respective wheels.

While commercially operated snagging wheels are subjected to much more severe pressure and speed conditions in actual field operations and the above testing procedure does not duplicate such commercial grinding conditions it has been found that the above described testing procedure does provide a very accurate comparative test procedure for the evaluation of newly developed grains.

In the grinding tests, similar wheels made from grain that has been fused and crushed as well as grain that had been fused, crushed and calcined in air for two hours. These wheels were all tested as above described.

The results of the grinding tests are tabulated below.

Table No. 4

| | Wheel Wear -Ww | Metal Removed MR | Ratio MR/Ww | 'a' | RGR | RRC | RRWw |
|---|---|---|---|---|---|---|---|
| Standard alumina-25% zirconia wheel | 68.3 | 155 | 2.28 | 16 | 100 | 100 | 100 |
| Heat treated standard alumina-25% zirconia | 66.4 | 146 | 2.20 | 22 | 96 | 95 | 97 |
| Ceria wheel | 48.4 | 136 | 2.81 | 22 | 124 | 88 | 71 |
| Heat Treated Ceria | 53.9 | 157 | 2.92 | 14 | 144 | 101 | 76 |

Ww = cu.in. per hour
MR = lb/hour
Heat treatment = 2 hours in air at 1250°C.

From the Ww column one can see that the ceria-containing wheels exhibit less wheel wear than the standard wheel.

From the MR column the rate of cut is lower for the ceria wheel but the ceria wheel made from calcined grain has the equivalent cut of the standard wheel while exhibiting much less wheel wear.

From the ratio MR/ww, it is obvious that the ceria wheels remove more metal per cubic inch of wheel wear and that heat treatment improves this ratio.

The $a$ value for the heat-treated ceria product is lower than that for the standard snagging wheel containing alumina-25% zirconia quick chilled material. This is a desirable feature.

The RGR (Relative Grinding Ratio) is = $\dfrac{\text{MR} \div \text{Ww of ceria wheel}}{\text{MR} \div \text{Ww of standard wheel}}$ This indicates that for the same wheel wear the ceria wheel removes 1.24 times as much metal and with heat treated grain 1.44 times as much metal.

The RRC (Relative Rate of Cut) is = $\dfrac{\text{MR of ceria wheel}}{\text{MR of standard wheel}}$ and shows the ceria wheel cuts more slowly than the standard wheel, but the heat treated wheel cuts at about the same rate as the standard wheel.

RRww (Relative Rate of Wheel Wear) is = $\dfrac{\text{Ww of Ceria wheel}}{\text{Ww of standard wheel}}$ and shows the ceria wheels are much more durable than the standard wheel.

As further evidence that ceria-containing products are more durable than normal alumina-25% zirconia product, the impact test $k$ values for these two products are shown before and after heat-treatment. (2 hours at 1250°C)

Table No. 5

| | $k$ Value | |
|---|---|---|
| | 8/9 Tyler | 12/12 Tyler |
| Standard alumina-25% zirconia product | 0.058 | 0.056 |
| Heat treated alumina-25% zirconia | 0.108 | 0.10 |
| Ceria product | 0.092 | 0.074 |
| Heat-Treated Product | 0.058 | 0.046 |

The $k$ value is inversly proportional to the strength and durability of the grain. It is determined as follows:

Evaluation of abrasives for snagging grinding is a developing art. One measure of suitability of a particular abrasive is its friability. This property is measured by various different methods ranging from testing how easy it is to crush a given grit by hand between the jaws of a pair of pliers, to more sophisticated quantitative measures of the amount of breakdown which is achieved when a sample containing a large number of grits of the given material is subjected to attrition in a ball mill or by some other means. The method which is employed to determine k value involves subjecting each grit particle in a large sample of uniform size and shape to a single impact against a rapidly rotating steel paddle, and subjecting the particles resulting from the impact to a screen size analysis. Extensive testing in this manner over long periods of time has shown that brittle material such as abrasives, when impacted in this manner break down in a manner described by the following equation:

$$R = (1 - \frac{x}{x_o})^k ,$$

in which R is the fraction by weight of the grain remaining on a given screen having openings of the dimension $x$; $x_o$ is the effective initial size of the grains (before impact), and $k$ is a number which can be considered representative of the number of flaws in the material being tested. The lower the value of $k$, the stronger the material. The impact test method is discussed in Single Impact Testing of Brittle Material by Karpinski and Tervo, at pages 126 to 130 of the June 1965 issue of Transactions of the Society of Mining Engineers.

In performing a determination of $k$ value a test sample is prepared from the crude abrasive by crushing and screening. The test sample comprises the part of the crushed abrasive that is retained between two specified adjacent screens in the Tyler series, after screening for one-half hour with a Tyler Ro-Tap sieve shaker (available from W. S. Tyler Co., Cleveland, Ohio). The sample weight is chosen to provide about 10,000 individual abrasive grits. For 14 grit, typically used for impact testing, a 100 gram sample is adequate.

The grains are dropped essentially one at a time, into an evacuated chamber (e.g. 2mm Hg), in which they are struck in direct central impact by a mild steel vane that is moving at a predetermined velocity. The grain is driven by the impact into a collecting pot. Secondary impact is minimized by lining all the adjacent metal surfaces with gasket rubber.

The grain that has been collected in the pot is then screened for one-half hour on a nest of Tyler screens (adjacent sizes) in a Ro-Tap shaker to determine the post impact size distribution in terms of weight of grain on each screen and on the pan. In the determination of $k$ referred to herein, the paddle center was twelve inches radially from the center of rotation, and its speed was 2000 revolutions per minute, corresponding to a speed of 209 feet per second.

In an actual determination of a $k$ value, typically four screens would be used with a pan beneath them in the Ro-Tap machine. The first screen (arbitrarily denominated the "O" screen), is the screen upon which the test material was retained in the sizing operation. The succeeding screens, denominated 1, 2, 3, 4 etc. are each smaller than the preceding screen by the factor 1.189 (the fourth root of 2), in the Tyler screen system. This fact can be used to simplify calculations by preparing tables of values of the reciprocal of the logarithm of $1-(x/x_o)$ for various values of $x_o$ (which normally will be between 1 and 1.5, when the O screen is a arbitrarily assigned the value of 1 unit for its opening size).

The weights of grain on the several screens are recorded in order, starting with the O screen, and the cummulative fractions, R, of the total sample by weight on each screen are calculated. A value of $x_o$, say 1.02, is arbitrarily selected and from R for each screen, $k$ is calculated from the formula:

$$k = \frac{\log R}{\log(1 - \frac{x}{x_o})},$$

for each value of R. If the values of $k$ are the same for each R, then the correct $x_o$ has been chosen and $k$ and $x_o$ are known. If the values of $k$ differ by more than one unit in the third decimal place, a new value of $x_o$ is chosen. This is repeated until $k$ is determined with the desired degree of accuracy.

Note from the data in Table No. 5, the standard product becomes weaker after heat-treatment while the ceria product gains in strength. This $k$ value characteristic is reflected in the grinding data results shown in the previous Table No. 4. By preparing even stronger ceria grain by means of modifications in the comminution process, a more durable product can be made than that shown above. That is, if the ceria product was impact crushed and shaped until it had a $k$ value equal to that of standard alumina-25% zirconia (=0.058), then on heat treatment the resultant grain would be much more durable and give even better grinding results.

EXAMPLE II

A series of additional melts were made up with the following amounts of ceria in the final product:

Table No. 6

| %Ceria | % SiO$_2$ | % Fe$_2$O$_3$ | % TiO$_2$ | % ZrO$_2$ | %NaO | %Al$_2$O$_3$ by Difference |
|---|---|---|---|---|---|---|
| 0.0 | .63 | .26 | .20 | 25.78 | .10 | 73.03 |
| 0.08 | .55 | .22 | .18 | 25.95 | .10 | 72.97 |
| 1.45 | .54 | .18 | .20 | 23.43 | .10 | 75.55 |
| 4.33 | .55 | .18 | .19 | 21.52 | .10 | 77.46 |
| 9.29 | .12 | .21 | .12 | 21.14 | .11 | 78.30 |

The fusions were chill cast using the ball casting technique described in Canadian Patent to Shurie No. 924,112 Apr. 10, 1973, using 2 inch diameter steel balls. They were then processed into grain and the yield and $k$ value measured. All products received the same comminution treatment.

Table 7

| % CeO$_2$ | Impact Crushed Product Yield Screen sizing | | Impact Crushed & shaped Product $k$ Value 12/14 Tyler |
|---|---|---|---|
| | +6 | (−6+18) | |
| 0 | 11.5 | 50.0 | 0.054 |
| 0.08 | 12.8 | 46.4 | 0.056 |
| 1.45 | 12.2 | 52.2 | 0.066 |
| 4.33 | 19.2 | 42.4 | 0.077 |
| 9.29 | 5.0 | 48.8 | 0.108 |

This table shows a remarkable increase in yields of coarse grits for 1.45 and 4.33% ceria additions. An increase in yield, coupled with good grain durability (as shown by $k$ value) indicates these resultant products should be good snagging abrasives.

In all of the discussion above, wherever a screen size is given, Tyler mesh is to be understood. Also any % designation used, is based on a weight percent of the whole. While the examples given above show co-fusions of alumina, zirconia and ceria in the range of from about 1 to 7% ceria and about 25% zirconia with the remainder being alumina and a small percentage of inert impurities, it is contemplated that similar improved abrasive grains can be produced with zirconia present in the range of from 10% to as high as 60%, the remainder being Al$_2$O$_3$.

The above description covers the preferred form of my invention. Modifications thereof may occur to those skilled in the art which will fall within the scope of the following claims.

What is claimed is:

1. An improved fused crushed abrasive grain consisting essentially of a co-fusion of alumina, zirconia and ceria; said zirconia being present in a range of from 10 to 60% by weight; the ceria being present in a range of from 1 to about 7%.

2. A grain as in claim 1 wherein the zirconia is present in the amount of from 21 to 26%.

3. A grain as in claim 1 that has been calcined at 800° to 1250°C to improve its toughness.

4. A grain as in claim 2 that has been calcined at 800° to 1250°C to improve its toughness.

* * * * *